United States Patent [19]

Terink et al.

[11] 4,435,436

[45] Mar. 6, 1984

[54] ALKALIZED COCOA POWDERS AND FOODSTUFFS CONTAINING SUCH POWDERS

[75] Inventors: Johannes L. Terink; Maurits J. Brandon, both of Zaandam, Netherlands

[73] Assignee: Cacaofabrik DeZaan B.V., Koog aan de Zaan, Netherlands

[21] Appl. No.: 358,763

[22] Filed: Mar. 16, 1982

[30] Foreign Application Priority Data

May 14, 1981 [NL] Netherlands ......................... 8102377

[51] Int. Cl.$^3$ .......................... A23G 1/00; A23G 1/02
[52] U.S. Cl. .................................... 426/631; 426/270; 426/593; 426/540
[58] Field of Search ................. 426/631, 45, 270, 593, 426/262, 655, 540

[56] References Cited

U.S. PATENT DOCUMENTS

| | | | |
|---|---|---|---|
| 2,397,402 | 3/1946 | Benedict | 99/23 |
| 2,558,854 | 7/1951 | Kempf et al. | 99/23 |
| 2,745,746 | 5/1956 | Jones | 99/23 |
| 3,056,677 | 10/1962 | Colten et al. | 99/26 |
| 3,119,693 | 1/1964 | Colten et al. | 99/26 |
| 3,754,928 | 8/1973 | Haney | 426/631 |
| 4,343,818 | 8/1982 | Eggen | 426/45 |
| 4,349,579 | 9/1982 | Raboud et al. | 426/631 |

FOREIGN PATENT DOCUMENTS

| | | |
|---|---|---|
| 2154576 | 5/1973 | France . |
| 562123 | 6/1944 | United Kingdom . |
| 1399269 | 7/1975 | United Kingdom . |

OTHER PUBLICATIONS

H. J. Schenkel, "Colour Formation in the Dutch Processing of Cocoa", *The Manufacturing Confectioner*, (Aug. 1973), pp. 26–33.
R. C. Welch, "Dutched or Alkalized Cocoa Nib Process", *The Manufacturing Confectioner*, (Mar. 1981), pp. 52–53.
H. Foster, "What is Chocolate Flavor?", *The Manufacturing Confectioner*, (May 1978), pp. 51, 56.
C. E. Taneri, "Chocolate Liquor Dutching", *The Manufacturing Confectioner*, (Sep. 1977), pp. 57–58.
S. Porcello, "Cocoa Standards and Testing", *The Manufacturing Confectioner*, (Apr. 1978), pp. 43–47.
D. G. Mitchell, "Cocoa Flavors", *The Manufacturing Confectioner*, (Apr. 1978), pp. 60–66.
Minifie, Chocolate, Cocoa and Confectionery, Sci. & Tech. 2nd Ed., Avi Pub. Co., Westport, Conn., 1980, pp. 45–51, 61–65.

*Primary Examiner*—Jeanette M. Hunter
*Attorney, Agent, or Firm*—Ronald A. Bleeker

[57] ABSTRACT

An improved alkalized cocoa powder is described having a desirable dark color but avoiding the unpleasant taste and flavor which is often obtained with intensely alkalized cocoa powders. The claimed alkalized cocoa powder has a pH of 7.5 or less; a ratio of pH: alkalinity of the ash below 0.046; color coordinates L between 9.0 and 14.0, a between 4.0 and 8.0, and b between 2.0 and 6.0; and neither more nor other acid radicals present than those which are naturally present in fermented cocoa.

25 Claims, No Drawings

ALKALIZED COCOA POWDERS AND FOODSTUFFS CONTAINING SUCH POWDERS

BACKGROUND OF THE INVENTION

This invention relates to improved alkalized cocoa powders. The alkalization of cocoa products, e.g. cocoa beans, cocoa nib, cocoa mass (cocoa liquor, unsweetened chocolate) or cocoa cakes is normally effected by treatment of the said products with solutions of alkaline compounds, e.g. carbonates or hydroxides of sodium or potassium. Usually, said cocoa products are alkalized with the object of, by grinding and, if necessary, removal of part of the fat, producing from them an alkalized cocoa powder. Alkalization of cocoa powder as such is also known.

Alkalization may be said to be "slight" if a 10% solution of the cocoa powder in water exhibits a pH lying between that of non-alkalized cocoa powder, namely about 5.5, and neutrality, namely about 7, maximum 7.5. Intenser alkalization results in cocoa powder with a pH of 7.5 to 8 or even higher depending on the amount of alkali added.

A usual measure of the amount of added alkali is the alkalinity of the ash of the relevant cocoa powder, expressed in milli-equivalents of hydrochloric acid needed to neutralize the ash of 100 g of fat-free and dry cocoa powder, as described in the Analytical Methods of the International Office of Cocoa and Chocolate and the International Sugar Confectionery Manufacturers' Association, page 103/B/E-1977 (alkalinity of the total ash).

Usually the purpose of slight alkalization is to neutralize the acids present in cocoa in its natural state. Also, the astringency is reduced. Consequently by slight alkalization a considerable improvement in taste and flavour can be achieved. Generally speaking, slightly alkalized cocoa powders are also somewhat darker than non-alkalized cocoa powders.

By intense alkalization cocoa powders can be obtained with a greater colouring capacity than slightly alkalized cocoa powders. Depending on the way the alkalization is performed, intensely alkalized cocoa powders can be more or less intense, reddish-brown, grayish brown or even nearly black in colour. In particular cocoa powders with intensely brown-red shades are sought, since foodstuffs prepared with these acquire an especially attractive, rich chocolate colour. A great colouring capacity also makes these cocoa powders especially economical in use. As examples of applications of intensely alkalized cocoa powders the following can be mentioned: bakery products, desserts, ice cream, cocoa beverages, toppings for ice cream, biscuits or confectionery and compound coatings. Also the intensely alkalized cocoa powders in question are preferably used in products which first need further preparation to obtain a consumable product, such as cake mixes, ice cream mixes, dessert powders and so-called instant cocoa mixes, because of the attractive colour of the product when ready for consumption.

The importance of the use of cocoa powders with great colouring capacity is highlighted by the general tendency to restrict the use of artificial colours, the use of which in the above foodstuffs is actually prohibited in many countries. It is, of course, also possible to mix cocoa powders with great colouring capacity and slightly alkalized or even non-alkalized cocoa powders, in order to obtain a mixture in which the advantages of both types are combined. In order to obtain cocoa powders with great colouring capacity it is customary to add a lot of alkali, although in various countries this addition is restricted pursuant to food regulations. The hitherto known cocoa powders of this type consequently exhibit a considerably higher pH than slightly alkalized cocoa powders, frequently about 8 or even higher. In order to obtain a very great colouring capacity alkali has to be added in such quantities that the cocoa powders thus obtained no longer meet the respective legal requirements of a number of countries, as a result limiting their salability. Moreover, the intense alkalization hitherto necessary for the production of cocoa powders with a great colouring capacity has yet other major disadvantages. Namely, intensely alkalized cocoa powders have as a rule a considerably worse taste and flavour than slightly alkalized cocoa powders. The taste of the first-named type of cocoa powders is usually characterized as alkaline or salty.

Other well-known disadvantages of the hitherto known intensely alkalized cocoa powders become apparent when these powders are used in the manufacture of foodstuffs. Probably these drawbacks are connected with the high pH of these powders and/or their high content of alkalizing agents or of their conversion products developed during alkalization. Consequently, cakes and similar bakery products which are prepared with the types of cocoa powder in question will readily exhibit an irregular crumb structure. Glazings, chocolate 'truffles', iced chocolates and compound coatings containing fats of the so-called lauric acid type may, if prepared with the cocoa powders in question, readily develop an intense soapy flavour, thus making these products completely impalatable. It is presumed that this phenomenon is caused by saponification of the fat under the influence of the strongly alkaline cocoa powder.

It will be obvious that the above-named disadvantageous properties of the hitherto known cocoa powders tend to increase in degree as the alkalization is intensified in order to obtain an intenser cocoa powder colour.

DETAILED DISCUSSION OF THE INVENTION

Surprisingly it has now been discovered that cocoa powders with very great colouring capacity do not show the disadvantages normally inherent to these types of cocoa powders provided they meet the following conditions:

(a) a pH corresponding to the pH of slightly alkalized cocoa powders, in other words below 7.5, preferably below 7.3, (b) a ratio pH: alkalinity of the ash below 0.046, preferably below 0.043, particularly below 0.041, (c) the absence of more, or other acid radicals than those by nature present in fermented cocoa, (d) a colour coordinate L, as determined by the Hunter method, between 9.0 and 14.0, preferably between 10.0 and 12.0; a colour coordinate a between 4.0 and 8.0, preferably between 5.0 and 7.0; a colour coordinate b between 2.0 and 6.0, preferably between 2.0 and 4.0 and a ratio b/a preferably below 0.6, particularly below 0.5.

Consequently, the present invention relates to alkalized cocoa powders having a pH of 7.5 or less, preferably below 7.3, a ratio pH: alkalinity of the ash below 0.046, preferably below 0.043, particularly below 0.041, in which not more or other acid radicals are present than those by nature present in fermented cocoa and the colour of which is characterized by a colour coordinate L between 9.0 and 14.0, preferably between 10.0 and 12.0, a colour coordinate a between 4.0 and 8.0, preferably between 5.0 and 7.0 and a colour coordinate b between 2.0 and 6.0, preferably between 2.0 and 4.0 and the ratio b/a preferably below 0.6, particularly below 0.5.

The present invention also relates to foodstuffs, including mixtures with other cocoa powders or cocoa powder replacement products, containing such alkalized cocoa powder.

The colour (the colouring capacity) of cocoa powders can be specified by means of colour coordinates. A frequently used system, also used in the present application, has been developed by R. S. Hunter; in this system the colour coordinates are denoted by the characters L, a and b. The value of the colour coordinates can be determined with an appropriate measuring system, as will be discussed in detail hereafter. The colour coordinates L, a and b are derived from X-, Y- and Z-Tristimulus values of the CIE (International Commission on Illumination) to obtain, contrary to the X-, Y-, Z-system, equidistant locations in the tridimensional colour space for colours which to the eye show equal differences.

The L-coordinate can assume values between 0 (black) and 100 (white). The L-value for non-alkalized cocoa powders is normally 20 or higher (measured by the method described below); for slightly alkalized cocoa powders it is about 16 to 20, whereas intensely alkalized and intensely coloured cocoa powders generally have L-values of 13 to 16. A high value of the a-coordinate indicates a pronounced red component in the colour of the cocoa powder; a high value of the b-coordinate points to the presence of a lot of yellow. The ratio b/a is sometimes used to indicate the shade of red (brown) of cocoa powders: a ratio of about 0.7 or higher is indicative of the weak orange-brown colours of slightly alkalized cocoa powders, whereas lower ratios point to more reddish shades. The above, highly-sought intensely red-brown cocoa powders are characterized by a ratio b/a of 0.6 or lower. The colour impression does not, nevertheless, depend exclusively on the ratio b/a. At low values, e.g. the colour coordinate a lower than 5.0 and the colour coordinate b lower than 2.0, the colour becomes grayish.

The L-, a- and b- values of cocoa powder discussed here have been determined with the Hunterlab Digital Colour Difference Meter, type D 25 D 2 A. The measurement is performed in an aqueous suspension of cocoa powder which by use of agar (Bacto-Agar, Difco) is made into a firm gel. The agar gel prevents the cocoa particles from settling, and the colour sample can be placed in the measuring apparatus in a simple manner.

The measurements described herein have been performed according to the following method:

Weigh 1.2 g of the cocoa powder into a 100 ml beaker and add 5 ml of water at 60° C. Stir until a homogeneous paste is obtained. Add 45 g of a freshly prepared 2.5% agar solution, kept at 50° C. and mix rapidly until the mixture is homogenous. Then pour the agar suspension as quickly as possible into a Petri dish which is lying exactly level and allow to cool for 15 minutes.

Remove the agar slab thus obtained from the Petri dish by means of a broad spatula and place it on a white tile. Bring the tile with the slab into the calibrated Hunterlab Digital Color Difference Meter and press the agar slab lightly against the measuring orifice, without protrusion of the surface in the apparatus. Read the L-, a- and b- values.

Cocoa powders of the present invention can be obtained by means of various, as such well known, alkalization methods. Thus, a cocoa powder which meets the above criteria can be obtained by adding a solution of 4.1% of potassium hydroxide (calculated on the fat-free and dry cocoa material) to non-alkalized cocoa powder in a double-walled kneader, kneading the obtained paste at a temperature between approximately 65° C. and 90° C., while replenishing the water evaporated, until the pH of the material after drying has decreased to 7.5 or lower. Depending on the sort of cocoa beans from which the non-alkalized cocoa powder has been prepared, and on the temperature and the action of the kneader, the above process may take between 4 and 24 hours. The paste is then dried and the product ground to powder. The amount of potassium hydroxide mentioned is the equivalent of 5% of potassium carbonate, being the maximum amount of alkalizing agent permitted in many countries.

In the following example the above process is explained in detail.

EXAMPLE

The starting material was non-alkalized cocoa powder, obtained from Cameroon and Ghana cocoa beans and with the following analysis:
Fat content: 10.0%
Moisture content: 3.0%
pH: 5.75
Ash content, on fat-free and dry matter: 7.0%
Alkalinity of the ash: 93.2
Colour: L=22.1, a=10.2, b=8.5

In a pre-heated double-walled Z-kneader (Norton) with a volume of 3.5 l, 200 g of the above cocoa powder was mixed with a solution of 6.8 g of potassium hydroxide in 153 ml of water, pre-heated to 80° C. In the double wall, water of 95° C. was circulated; the temperature of the contents of the kneader was about 75° C. From time to time the water evaporated was replenished until the viscosity of the contents of the kneader was estimated to have regained its original level. At intervals a small quantity of the material was removed and dried under vacuum, and the pH of a 10% suspension was measured. After 4 hours' kneading the pH had decreased from about 9 to 7.3. The material was then dried and ground to powder.

The following is the result of an analysis of the product:
Fat content: 9.8%
Moisture content: 5.1%
pH: 7.3
Ash content, on fat-free and dry matter: 10.8%
Alkalinity of the ash: 162.3
Colour: L=12.0, a=6.8, b=3.8

The flavour of the cocoa powder obtained was judged to be mild and only a little astringent, while an alkaline or salty taste was absent. A so-called "Devil's Food Cake" was prepared with 3.5% of this cocoa powder. The cake exhibited the intensely red-brown colour desirable for this type of cake, and had a regular and fine pore structure.

We claim:

1. An alkalized cocoa powder having a pH of 7.5 or less; a ratio pH: alkalinity of the ash below 0.046; color coordinates L between 9.0 and 14.0, a between 4.0 and 8.0, and b between 2.0 and 6.0; in which neither more nor other acid radicals are present than those by nature present in fermented cocoa.

2. An alkalized cocoa powder according to claim 1 wherein the value of L is between 10.0 and 12.0, a is between 5.0 and 7.0, and b is between 2.0 and 4.0.

3. An alkalized cocoa powder according to claims 1 or 2 wherein the pH is less than 7.3.

4. An alkalized cocoa powder according to claim 1 wherein the ratio pH: alkalinity of the ash is below 0.041.

5. An alkalized cocoa powder according to claim 2 wherein the ratio pH: alkalinity of the ash is below 0.041.

6. An alkalized cocoa powder according to claim 3 wherein the ratio pH: alkalinity of the ash is below 0.041.

7. An alkalized cocoa powder according to claim 1 wherein the ratio b/a is less than 0.5.

8. An alkalized cocoa powder according to claim 2 wherein the ratio b/a is less than 0.5.

9. An alkalized cocoa powder according to claim 3 wherein the ratio b/a is less than 0.5.

10. An alkalized cocoa powder according to claims 4 or 5 wherein the ratio b/a is less than 0.5.

11. An alkalized cocoa powder according to claim 6 wherein the ratio b/a is less than 0.5.

12. An alkalized cocoa powder prepared by a process comprising the following steps:
    (a) mixing, in a double-walled Z-kneader, an aqueous solution of potassium hydroxide and a cocoa powder having the following characteristics:
    Fat content: 10%
    Moisture content: 3%
    pH: 5.75
    Ash content, on fat-free and dry matter: 7.0%
    Akalinity of the ash: 93.2
    Color: L=22.1, a=10.2, b=8.5;
    (b) kneading the resulting mixture in the double-walled Z-kneader, while maintaining the temperature of the mixture therein at about 75° C. and periodically replenishing the mixture with moisture so that the mixture retains its original level of viscosity, until such time as a 10% suspension of a portion of the kneaded material is found to have a pH of about 7.3; and
    (c) drying and grinding the kneaded material to obtain a powdered product.

13. A process for preparing an alkalized cocoa powder, comprising the following steps:
    (a) mixing, in a double-walled Z-kneader, an aqueous solution of potassium hydroxide and a cocoa powder having the following characteristics:
    Fat content: 10%
    Moisture content: 3%
    pH: 5.75
    Ash content, on fat-free and dry matter: 7.0%
    Akalinity of the ash: 93.2
    Color: L=22.1, a=10.2, b=8.5;
    (b) kneading the resulting mixture in the double-walled Z-kneader, while maintaining the temperature of the mixture therein at about 75° C. and periodically replenishing the mixture with moisture so that the mixture retains its original level of viscosity, until such time as a 10% suspension of a portion of the kneaded material is found to have a pH of about 7.3; and
    (c) drying and grinding the kneaded material to obtain a powdered product.

14. Foodstuffs containing an alkalized cocoa powder having a pH of 7.5 or less; a ratio pH: alkalinity of the ash below 0.046; color coordinates L between 9.0 and 14.0, a between 4.0 and 8.0, and b between 2.0 and 6.0; in which neither more nor other acid radicals are present than those by nature present in fermented cocoa.

15. Foodstuffs according to claim 14 wherein the value of L is between 10.0 and 12.0, a is between 5.0 and 7.0, and b is between 2.0 and 4.0.

16. Foodstuffs according to claims 14 and 15 wherein the pH of the alkalized cocoa powder is less than 7.3.

17. Foodstuffs according to claim 14 wherein the ratio pH: alkalinity of the ash is below 0.041.

18. Foodstuffs according to claim 15 wherein the ratio pH: alkalinity of the ash is below 0.041.

19. Foodstuffs according to claim 16 wherein the ratio pH: alkalinity of the ash is below 0.041.

20. Foodstuffs according to claim 14 wherein the ratio b/a is less than 0.5.

21. Foodstuffs according to claim 15 wherein the ratio b/a is less than 0.5.

22. Foodstuffs according to claim 16 wherein the ratio b/a is less than 0.5.

23. Foodstuffs according to claims 17 or 18 wherein the ratio b/a is less than 0.5.

24. Foodstuffs according to claim 19 wherein the ratio b/a is less than 0.5.

25. Foodstuffs containing an alkalized cocoa powder prepared according to claim 12.

* * * * *